United States Patent

Baba et al.

Patent Number: 5,973,058
Date of Patent: Oct. 26, 1999

[54] SILICONE RUBBER COMPOSITION AND METHOD FOR MOLDING SILICONE RUBBER

[75] Inventors: Katsuya Baba; Kazuo Hirai; Takao Matsushita, all of Chiba Prefecture, Japan

[73] Assignee: Dow Corning Toray Silicone Co., LTD., Tokyo, Japan

[21] Appl. No.: 08/958,833

[22] Filed: Oct. 28, 1997

[30] Foreign Application Priority Data

Oct. 29, 1996 [JP] Japan ................................. 8-303736

[51] Int. Cl.⁶ ....................................................... C08K 3/34
[52] U.S. Cl. ............................. 524/493; 528/24; 524/847; 524/860
[58] Field of Search ............................... 528/24; 524/493, 524/847, 860

[56] References Cited

U.S. PATENT DOCUMENTS

| | | | |
|---|---|---|---|
| 4,260,536 | 4/1981 | Yonezawa et al. | 260/37 SB |
| 4,743,671 | 5/1988 | Dorn et al. | 528/24 |

FOREIGN PATENT DOCUMENTS 0 239 961  10/1987  European Pat. Off.
59-18758   1/1984   Japan.

OTHER PUBLICATIONS

Chemical Abstracts, vol. 100, No. 26, Jun. 25, 1984, Columbus, Ohio, US; abstracts no. 211443.

*Primary Examiner*—Melvyn I. Marquis
*Attorney, Agent, or Firm*—William F. Boley; Jennifer S. Warren

[57] ABSTRACT

A silicone rubber composition that does not foam or evolve an unpleasant odor during its cure and that cures into low-surface-tack, non-yellowing silicone rubber moldings comprises:

(A) polydiorganosiloxane gum with the average component formula $R_aSiO_{(4-a)/2}$ where R represents substituted and unsubstituted monovalent hydrocarbon groups and a is from 1.9 to 2.1, (B) microparticulate silica, (C) bis(ortho-methylbenzoyl)peroxide, and (D) bis(para-methylbenzoyl)peroxide, wherein the component (C) to component (D) weight ratio is from 1:9 to 8:2.

4 Claims, No Drawings

SILICONE RUBBER COMPOSITION AND METHOD FOR MOLDING SILICONE RUBBER

BACKGROUND OF THE INVENTION

This invention relates to silicone rubber compositions and methods for molding silicone rubbers for use in the extrusion molding of tube, sheet, wire and cable coatings, and to a method for molding the corresponding silicone rubbers. More particularly, this invention relates to silicone rubber compositions with a new combination of organoperoxide curing agents.

Silicone rubbers are frequently used for the extrusion molding of tube, tape, sheet, wire and cable coatings, and the like because these rubbers offer an excellent heat resistance, cold resistance, weathering resistance, and electrical characteristics. 2,4-Dichlorobenzoyl peroxide has been used as a curing agent for effecting the cure of the silicone rubber compositions used as the feedstock in these extrusion molding applications. However, various problems are associated with silicone rubber compositions that contain this organoperoxide: they evolve an unpleasant odor when cured, their cure yields moldings that have a sticky, or tacky surface, and blooming occurs onto the surface of their silicone rubber moldings. This blooming is caused by the gradual bleed out of curing agent decomposition products with an associated whitening of the molding's surface. These decomposition residues can also cause environmental pollution. A number of investigations have already been carried out in order to solve these problems. For example, Yonezawa et al. in U.S. Pat. No. 4,260,536 propose a method for preparing low-surface-tack silicone rubber moldings that uses bis(2,4-dichlorobenzoyl)peroxide and di-tert-butyl peroxide as curing agent. However, this is not a completely satisfactory method because it still leads to the evolution of an unpleasant odor during cure and because it does not completely suppress surface tack in the molding. Japanese Patent Application Laid Open (Kokai or Unexamined) Number Sho 59-18758 (18,758/1984) teaches a method that uses bis(ortho-methylbenzoyl)peroxide as curing agent for silicone rubber compositions. This method avoids the evolution of unpleasant odor and does not cause blooming. Dorn, et al. in U.S. Pat. No. 4,743,671 teach a method that uses bis(para-methylbenzoyl)peroxide as curing agent for silicone rubber compositions, and this method also solves the same problems. However, the silicone rubber moldings afforded by thermosetting a silicone rubber composition prepared by the former method are susceptible to yellowing, or taking on a yellowish tinge. Silicone rubber compositions prepared by the latter method suffer from slow cure rates and tend during curing to foam with the formation of extremely small bubbles, creating voids in the rubber.

An object of the present invention is to provide a silicone rubber composition that does not foam or evolve an unpleasant odor during its cure and that cures into low-surface-tack, non-yellowing silicone rubber moldings. An additional object of the invention is to provide a method for molding silicone rubbers.

SUMMARY OF THE INVENTION

A silicone rubber composition that does not foam or evolve an unpleasant odor during its cure and that cures into low-surface-tack, non-yellowing silicone rubber moldings comprises:

(A) polydiorganosiloxane gum with the average component formula $R_a SiO_{(4-a)/2}$ where R represents substituted and unsubstituted monovalent hydrocarbon groups and a is from 1.9 to 2.1, (B) microparticulate silica, (C) bis(ortho-methylbenzoyl)peroxide, and (D) bis(para-methylbenzoyl)peroxide, wherein the component (C) to component (D) weight ratio is from 1:9 to 8:2.

DETAILED DESCRIPTION OF THE INVENTION

The object of the invention is achieved by a silicone rubber composition that does not foam or evolve an unpleasant odor during its cure and that cures into low-surface-tack, non-yellowing silicone rubber moldings comprising-:

(A) polydiorganosiloxane gum with the average component formula $R_a SiO_{(4-a)/2}$ in which R represents substituted and unsubstituted monovalent hydrocarbon groups and a is from 1.9 to 2.1, (B) microparticulate silica, (C) bis(ortho-methylbenzoyl)peroxide, and (D) bis(para-methylbenzoyl)peroxide, wherein the component (C) to component (D) weight ratio is from 1:9 to 8:2.

The objects of the invention are further achieved by a method for molding silicone rubber, characterized by introducing a silicone rubber composition as described above into an extrusion molder, fabricating an uncured molding, and then curing the molding in hot air at ambient pressure to give a silicone rubber molding.

This composition does not foam or evolve an unpleasant smell during its curing and at the same time cures into non-yellowing, low-surface-tack silicone rubber moldings. In addition, the method according to the present invention for molding silicone rubber is a very efficient method for fabricating silicone rubber moldings from silicone rubber compositions comprising the above-described components (A) to (D).

The polydiorganosiloxane gum (A) used in the present composition is the base component of the composition and is defined by the average component formula $R_a SiO_{(4-a)/2}$. R in this formula represents substituted and unsubstituted monovalent hydrocarbon groups and is specifically exemplified by alkyl such as methyl, ethyl, and propyl; cycloalkyl such as cyclohexyl; alkenyl such as vinyl, allyl, butenyl, and hexenyl; and aryl such as phenyl and tolyl; and by substituted monovalent hydrocarbon groups such as 3,3,3-trifluoropropyl, 2-phenylethyl and 2-cyanoethyl. The subscript a is a number from 1.9 to 2.1. This component preferably has a substantially straight-chain molecular structure, but may have a partially branched molecular structure. The degree of polymerization of this component can be in the range associated with organopolysiloxane gums by the individual skilled in the art, and a component (A) with a viscosity greater than $1 \times 10^7$ mPa.s at 25° C. and an average molecular weight greater than $25 \times 10^4$ will typically be used.

The micro-particulate silica (B) used in the present composition is an essential component that imparts an excellent mechanical strength to the silicone rubber moldings afforded by the vulcanization of the composition according to the present invention. The subject microparticulate silica is exemplified by dry-process silicas such as fumed silica and by wet-process silicas such as precipitated silica. These microparticulate silicas can also be used after surface hydrophobicization by treatment with an organosilicon compound such as organochlorosilane, hexaorganodisilazane, or diorganocyclopolysiloxane. Component (B) preferably has a particle size of less than 50 µm and a specific surface of at least 50 m²/g and more preferably of at least 100 m²/g. Component (B) is added at from 10 to 100 weight parts per 100 weight parts component (A). The present composition provides an unsatisfactory post-cure mechanical strength at additions below 10 weight parts component (B), while blending more than 100 weight parts of component (B) into component (A) is highly problematic.

The bis(ortho-methylbenzoyl)peroxide (C) and bis(para-methylbenzoyl)peroxide (D) used in the present composition are curing agents whose function is to cure the present composition. The component (C) to component (D) weight ratio must be from 1:9 to 8:2. At bis(ortho-methylbenzoyl) peroxide (C) proportions below 1:9, the cure rate is slow and foaming occurs with the concomitant development of voids within the silicone rubber molding. At bis(ortho-methylbenzoyl)peroxide proportions in excess of 8:2, that is, at low bis(para-methylbenzoyl)peroxide proportions, there is a pronounced tendency for yellowing to occur with elapsed time after admixture into the silicone rubber compound and the surface of the cured silicone rubber molding will be sticky (tacky). Each of these organoperoxides should be added at from 0.1 to 5 weight parts: the strength of the silicone rubber molding is reduced at less than 0.1 weight part, while the silicone rubber molding becomes overly hard at more than 5 weight parts.

The present silicone rubber composition comprises components (A) to (D), as described above, but may contain the various additives known for admixture into silicone rubber compositions, as long as the objects of the present invention are not impaired. These additives include crepe-hardening inhibitors such as silanol-endblocked diorganosiloxane oligomer, organohydroxysilane, and hexaorganodisilazane; inorganic fillers such as diatomaceous earth, quartz powder, calcium carbonate, and carbon black; heat stabilizers such as cerium hydroxide, cerium silanolate, and the cerium salts of fatty acids; and mold-release agents such as fatty acids and their metal salts, e.g., stearic acid, zinc stearate, and calcium stearate.

The composition of the present invention can be prepared simply by mixing components (A) to (D) to homogeneity. However, in a preferred preparation components (A) and (B) are preliminarily mixed to homogeneity while heating in a mixer such as a kneader mixer and components (C) and (D) are thereafter incorporated using a mixing means such as a two-roll mill.

Silicone rubber moldings can be fabricated from the present composition, for example, by continuously feeding the composition into an extrusion molder in order to fabricate the uncured silicone rubber molding and thereafter curing this molding in hot air at ambient pressure to give the silicone rubber molding. The extrusion molder used for this purpose can be those extrusion molders familiar in the art for the extrusion molding of silicone rubber compositions. The temperature in the hot-air cure of the silicone rubber composition will generally be in the range from 200° C. to 500° C.

The present composition as described above does not evolve unpleasant odor or foam during its cure and at the same time cures to give low-surface-tack, non-yellowing silicone rubber moldings. The subject composition is therefore extremely useful for applications where such properties are critical and in particular as extrusion-molding stock for tube, sheet, and wire and cable coating.

EXAMPLES

In the examples, "part" denotes "weight part", o-MeBPO is an abbreviation for bis(ortho-methylbenzoyl)peroxide, and p-MeBPO is an abbreviation for bis(para-methylbenzoyl)peroxide.

Example 1

100 parts vinyldimethylsiloxy-endblocked polydiorganosiloxane gum, with a degree of polymerization of 5,000, 99.6 mole percent dimethylsiloxy units, and 0.4 mole percent vinylmethylsiloxy units, 9.0 parts silanol-endblocked polydimethylsiloxane, with a viscosity of 60 mPa.s at 25° C., and 40 parts dry-process silica with a specific surface area of 200 m²/g were placed in a kneader mixer and mixed at 175° C. under reduced pressure for 60 minutes to homogeneity to give a silicone rubber base compound. A silicone rubber composition was then prepared by mixing bis(ortho-methylbenzoyl)peroxide and bis(para-methylbenzoyl) peroxide in the quantities reported in Table 1 into 100 parts of the base compound using a two-roll mill. Immediately after mixing the silicone rubber composition was fed to a 65 mm single-screw extruder configured for tube molding and extruded through a die to give a tube with an inside diameter of 10 mm and an outside diameter of 16 mm. The tubular product was then fed through a forced convection vulcanization oven set at 350° C. at a residence time of 1 minute to give a silicone rubber tube. In addition, silicone rubber composition was also taken immediately from mixing, held at a room temperature of 20° C. for 3 days, and then molded as above into silicone rubber tubes.

The silicone rubber tubes were evaluated for surface tack, yellowing, and the presence of voids. The surface tack was evaluated by finger touch; the degree of yellowing was visually evaluated; and the degree of void development was measured by sectioning the silicone rubber tube and inspecting the cross-sectional surface with a microscope. The measurement and evaluation results are reported in Table 1.

TABLE 1

|  | working examples ||| comparative examples ||||
|---|---|---|---|---|---|---|---|
|  | 1-1 | 1-2 | 1-3 | 1-4 | 1-5 | 1-6 | 1-7 |
| composition (in parts) | | | | | | | |
| base compound | 100 | 100 | 100 | 100 | 100 | 100 | 100 |
| o-MeBPO | 0.5 | 0.75 | 1.0 | 0 | 0.12 | 1.3 | 1.5 |
| p-MeBPO | 1.0 | 0.75 | 0.5 | 1.5 | 1.38 | 0.2 | 0 |
| immediately after mixing | | | | | | | |
| stickiness | A | A | A | A | A | A | A |
| yellowing | A | A | A | A | A | S | S |
| voids | A | A | A | P | P | A | A |
| 3 days after mixing | | | | | | | |
| stickiness | A | A | A | A | A | S | S |
| yellowing | A | A | A | A | A | S | S |
| voids | A | A | A | P | P | A | A | abbreviations used:
A = absent
P = present
S = substantial

Example 2

100 parts dimethylvinylsiloxy-endblocked polydiorganosiloxane gum, with a degree of polymerization of 5,000, and 99.84 mole percent dimethylsiloxy units, and 0.16 mole percent vinylmethylsiloxy units, 3.0 parts diphenylsilanediol, 3.0 parts silanol-endblocked methylphenylsiloxane oligomer, viscosity of 60 mPa.s at 25° C., and 40 parts dry-process silica with a specific surface area of 200 m²/g were placed in a kneader mixer and mixed at 160° C. under reduced pressure for 90 minutes to homogeneity. This was followed by the addition with mixing of 5 parts diatomaceous earth and 10 parts quartz powder to give a silicone rubber base compound. A silicone rubber composition was then prepared by mixing bis(ortho-methylbenzoyl)peroxide and bis(para-methylbenzoyl)peroxide in the quantities reported in Table 2 into 100 parts of the base compound using a two-roll mill. Immediately after mixing, the silicone rubber composition was fed into a 65 mm single-screw extruder configured for cable coating operations and was coated at a thickness of 0.5 mm on 1.0 mm outside-diameter tin-plated soft copper cable, containing twenty 0.18-mm twisted wires. The silicone rubber composition-coated cable was fed into a forced-convection oven at 450° C. and curing was effected by heating for 12 seconds to give a silicone rubber-coated cable. In addition, silicone rubber composition was also taken immediately from mixing, held at room temperature (20° C.) for 3 days, and then molded as described above to give silicone rubber-coated cable. The silicone rubber-coated cables were evaluated for surface tack, yellowing, and the presence/absence of voids. The surface tack was evaluated by finger touch; the degree of yellowing was visually evaluated; and the degree of void development was measured by sectioning the silicone rubber-coated cable and inspecting the cross-sectional surface with a microscope. The measurement and evaluation results are reported in Table 2. The maximum silicone rubber coating line speed, in meters per minute, was also measured in order to elucidate the cure rates of the silicone rubber compositions. The maximum silicone rubber coating line speed was determined by passing cable coated with the uncured silicone rubber composition through the oven at various speeds and determining the maximum speed at which the uncured silicone rubber composition became cured into the cured silicone rubber. The results are reported in Table 2.

TABLE 2

|  | Working examples | | | comparative examples | |
|---|---|---|---|---|---|
|  | 2-1 | 2-2 | 2-3 | 2-4 | 2-5 |
| composition (parts) | | | | | |
| base compound | 100 | 100 | 100 | 100 | 100 |
| o-MeBPO | 0.5 | 0.75 | 1.0 | 1.5 | — |
| p-MeBPO | 1.0 | 0.75 | 0.5 | — | 1.5 |

TABLE 2-continued

|  | Working examples | | | comparative examples | |
|---|---|---|---|---|---|
|  | 2-1 | 2-2 | 2-3 | 2-4 | 2-5 |
| immediately after mixing | | | | | |
| stickiness | A | A | A | S | A |
| yellowing | A | A | A | A | A |
| voids | A | A | A | A | P |
| 3 days after mixing | | | | | |
| stickiness | A | A | A | S | A |
| yellowing | A | A | A | S | A |
| voids | A | A | A | A | P |
| maximum coating line speed (m/minute) | 60 | 70 | 80 | 85 | 45 | abbreviations used:
A = absent
P = present
S = substantial

What is claimed is:

1. A curable silicone rubber composition comprising
   (A) 100 weight parts polydiorganosiloxane gum with the average component formula $R_a SiO_{(4-a)/2}$, where R represents substituted and unsubstituted monovalent hydrocarbon groups and a is from 1.9 to 2.1,
   (B) 10 to 100 weight parts micro-particulate silica,
   (C) 0.1 to 5 weight parts bis(ortho-methylbenzoyl) peroxide, and
   (D) 0.1 to 5 eight parts bis(para-methylbenzoyl)peroxide, wherein the component (C) to component (D) weight ratio is from 1:9 to 8:2.

2. The composition of claim 1 where the polydiorganosiloxane gum has a viscosity greater than $1 \times 10^7$ mPa.s at 25° C., and an average molecular weight of greater than $25 \times 10^4$.

3. The composition of claim 1 where the micro-particulate silica has a particle size of less than 50 μm and a specific surface area greater than 50 m²/g.

4. The composition of claim 1 where the micro-particulate silica component (B) has a specific surface area greater than 100 m²/g.

* * * * *